United States Patent
Yin et al.

(10) Patent No.: US 9,541,062 B2
(45) Date of Patent: Jan. 10, 2017

(54) METHOD OF OPERATING A WIND PARK

(71) Applicants: Bo Yin, Brande (DK); Bjorn Andresen, Ostbirk (DK); Michael Stoettrup, Herning (DK); Robert J. Nelson, Orlando, FL (US); Per Egedal, Herning (DK)

(72) Inventors: Bo Yin, Brande (DK); Bjorn Andresen, Ostbirk (DK); Michael Stoettrup, Herning (DK); Robert J. Nelson, Orlando, FL (US); Per Egedal, Herning (DK)

(73) Assignee: Siemens Aktiengesellschaft, Munich (DE)

( * ) Notice: Subject to any disclaimer, the term of this patent is extended or adjusted under 35 U.S.C. 154(b) by 543 days.

(21) Appl. No.: 14/084,657

(22) Filed: Nov. 20, 2013

(65) Prior Publication Data
US 2015/0137518 A1     May 21, 2015

(51) Int. Cl.
*G06F 19/00*     (2011.01)
*F03D 7/02*      (2006.01)
(Continued)

(52) U.S. Cl.
CPC ............ *F03D 7/0284* (2013.01); *F03D 7/048* (2013.01); *H02J 3/18* (2013.01); *H02J 3/386* (2013.01); *H02J 3/46* (2013.01); *Y02E 10/723* (2013.01)

(58) Field of Classification Search
CPC combination set(s) only.
See application file for complete search history.

(56) References Cited

U.S. PATENT DOCUMENTS

| | | | |
|---|---|---|---|
| 7,638,893 B2 | 12/2009 | Wobben | |
| 2002/0029097 A1* | 3/2002 | Pionzio, Jr. | ............. F03D 7/047 |
| | | | 700/286 |

(Continued)

FOREIGN PATENT DOCUMENTS

| | | | |
|---|---|---|---|
| EP | 2028368 A2 | 2/2009 | |
| EP | 2221957 A1 | 8/2010 | |
| EP | 2605357 | * 6/2013 | ................ H02P 9/00 |

OTHER PUBLICATIONS

H. Berndt et al: "TransmissionCode 2007, Network and System Rules of the German Transmission System Operators", Verband der Netzbetreiber—VDN e.V. beim VDEW, Aug. 2007 edition.

*Primary Examiner* — Kidest Bahta
(74) *Attorney, Agent, or Firm* — Beusse Wolter Sanks & Maire

(57) ABSTRACT

A method of operating a wind park having a plurality of wind turbines is provided. The method includes determining a grid condition indicator indicative of the condition of a grid into which the wind park feeds; determining a first maximum power value of the wind park on the basis of the grid condition indicator; determining an operating margin on the basis of the grid condition indicator, for a grid condition indicator indicative of a weak grid; determining a second maximum power value on the basis of the operating margin; and curtailing the active power output of the wind park according to a maximum power value. A computer program product for carrying out the steps of such a method; an active power controller adapted for use in operating a wind turbine of a wind park; a wind turbine; and a wind park are also provided.

15 Claims, 4 Drawing Sheets

(51) Int. Cl.
  *H02J 3/38*   (2006.01)
  *H02J 3/46*   (2006.01)
  *F03D 7/04*   (2006.01)
  *H02J 3/18*   (2006.01)

(56) References Cited

U.S. PATENT DOCUMENTS

| | | | |
|---|---|---|---|
| 2009/0033097 A1 | 2/2009 | Jurkat et al. | |
| 2009/0055030 A1* | 2/2009 | Mayor | F03D 7/0284 700/287 |
| 2010/0286835 A1* | 11/2010 | Nyborg | F03D 7/0224 700/287 |
| 2010/0308585 A1* | 12/2010 | Jorgensen | F03D 7/0284 290/44 |
| 2011/0118892 A1* | 5/2011 | Mayor | F03D 7/0284 700/295 |
| 2012/0063179 A1* | 3/2012 | Gong | H02M 1/12 363/40 |
| 2012/0143537 A1* | 6/2012 | Nielsen | F03D 7/048 702/60 |

\* cited by examiner

METHOD OF OPERATING A WIND PARK

FIELD OF INVENTION

The invention describes a method of operating a wind park; an active power controller adapted for use in operating a wind park; a wind turbine; and a wind park.

BACKGROUND OF THE INVENTION

A transmission line is generally realized to be able to transport a certain amount of power from a power generating plant to a utility grid. For example, a transmission line can be realized to transport the installed capacity of a power plant, i.e. the maximum or "installed" power that can be delivered by the power plant. For example, a wind farm with twenty 3 MW turbines has an installed capacity of 60 MW, i.e. that wind park can deliver up to 60 MW of active power, and a transmission line connecting the wind park to a power network or "grid" will be designed to be able to transport at least this quantity of power.

Problems arise when a transmission line—for whatever reason—cannot transport the installed capacity. For example, when one transmission line of a double transmission line is out of service, the maximum power transfer capacity of the double line is reduced due to an alteration in the short circuit ratio (SCR) of the system. In such a situation, the double line can no longer carry the installed capacity of a power plant to which it is connected. In the case of a wind power plant, this situation can lead to instability at turbine level, resulting in sustained or poorly damped oscillations seen in voltage, power, current and etc. The maximum power output of the wind park is therefore determined by the limited capacity of the transmission line.

When a transmission line fails or is out of service, the grid will be weakened as a result. The condition of a grid can be quantified in several ways. One way of expressing "grid condition" is by the short circuit ratio of the grid. This is obtained by determining the short circuit capacity of the grid, i.e. the amount of power at a point in the grid in the event of a short circuit. The short circuit capacity depends on the grid impedance at that point, the rated voltage, and any load on the grid. The wind turbines of a wind park can be regarded as an active load on the grid. A short circuit ratio (SCR) for a wind plant can therefore be determined by the grid three-phase short circuit capacity (SCC) divided by the rated power of the wind turbines feeding into the grid. The value of SCR that classifies a grid as "weak" may depend on the network operators. For example, according to the VDN Transmission code 2007 (Verband der Netzbetreiber, Version 1.1, August 2007) a grid is considered "weak" when its SCR drops below 4.0. Generally, a weak grid is characterized by a low SCR and high grid impedance. The issue is exacerbated at lower SCR values, when the system becomes increasingly "weak" with respect to the wind plant, the impedance increasingly high. Generally, an SCR below about 2.5 is considered to approach the limits of modern wind plants to sustain operation. At very low levels of SCR (e.g., below 2.5), any small perturbation or disturbance may cause one or more wind turbines to operate at undesirable operating points, and these turbines may be unable to return to normal operation. As a result, the turbines may trip and disconnect from the system. It is generally held that practical operation of a wind park with an SCR less than 1.25 is challenging, and operation of a wind park with an SCR less than about 0.9 is probably not possible using existing technology without active power curtailment.

Prior methods of dealing with such situations generally involve reducing or curtailing the active power output of the wind turbines of a wind park in order to ensure that the wind turbines continue to operate in a stable manner. In these approaches, a constant amount of active power is curtailed, based on a "worst case" design. However, this means that the power output of the wind park is generally reduced by more than is strictly necessary, and this in turn results in an unnecessary loss of revenue.

SUMMARY OF THE INVENTION

It is therefore an object herein to provide an improved way of controlling wind turbines feeding into a weak grid.

This object is achieved by a method of operating a wind park; by a computer program product; by an active power controller; by a wind turbine; and by a wind park described in embodiments herein.

According to an embodiment, a method of operating a wind park made up of a plurality of wind turbines is provided which includes determining a grid condition indicator and determining a first maximum power of the wind park based on the grid condition indicator. The "first maximum power" is to be understood as the maximum active power that is allowed to be transferred to the grid, and the "grid condition" governs to a large extent the amount of active power that can be transferred into it. The method further includes computing an operating margin on the basis of the grid condition indicator; determining a second maximum power on the basis of the defined operating margin; and curtailing the active power output of the wind park to the lowest maximum power value that is associated with stable operation of the wind park when the grid condition indicator is indicative of a weak grid.

An advantage of the method is that a turbine of a wind park can be controlled to deliver a power output at which its operation is stable, regardless of whether the wind park must feed into a weak grid. A grid can become weakened for various reasons, as explained in the introduction. For example, one of several transmission lines might be "down" due to a fault. The method can even deal with situations in which the short circuit ratio of a grid drops to very low values, as will become clear in the following. According to an embodiment, the active power output of the wind turbines is curtailed only when necessary, and only as a function of the grid condition indicator.

The "first maximum power" may be regarded as a "global" power value which can apply to the entire wind park. However, since the wind turbines must also be regarded as individual entities from a power generation point of view, the method herein allows a "local" second maximum power value to be computed for each individual turbine as required. This local maximum power value is tailored to that wind turbine's power generation capability and ensures that a safety margin or operating margin is maintained. In this way, the method makes it possible for a wind park to always deliver as much as active power as possible in a stable manner, and according to the grid condition.

In other words, the degree of curtailment is determined dynamically according to the actual grid condition. As a result, the annual energy production of a wind park can be increased, since the active power output can be curtailed to an overall lesser extent—i.e. not more than is strictly necessary—during certain transmission line faults or other situations in which the grid is "weak".

According to an embodiment, a computer program product comprising a non-transitory computer readable medium having instructions thereon can carry out the steps of such a method loaded into a memory of a programmable device of a wind turbine controller and/or a wind park controller.

An advantage of the computer program product is that it can essentially continuously monitor the grid condition and the results can be used to generate suitable control signals that curtail the active power output of a wind turbine.

According to an embodiment, an active power controller adapted for use in operating a wind park (comprising a plurality of wind turbines) comprises a grid condition determination unit for determining a grid condition indicator; a first maximum power computation unit for determining a first maximum power on the basis of the grid condition indicator; a unit for determining an operating margin on the basis of the grid condition indicator; a second maximum power computation unit for determining a second maximum power on the basis of the operating margin; and a regulating output for indicating a curtailment of the active power output of the wind park according to a power value.

An advantage of the active power controller is that it allows the wind turbines of a wind park to be operated in a tailored response to the momentary grid condition, taking into account the momentary grid condition in such a way that the active power output of the wind turbines of the wind park is curtailed only by the amount necessary to maintain stable operation. In this way, revenue loss due to excessive active power curtailment—i.e. curtailment beyond that which is strictly necessary—can be favorably minimized.

According to an embodiment, a wind turbine is arranged in a wind park and comprises a wind turbine controller, which wind turbine controller comprises an active power controller as described herein.

An advantage of the wind turbine herein is that it may always be controlled to deliver as much active power as possible, while at the same time taking into consideration the grid condition, so that the power output of the wind turbine is only curtailed by the amount necessary to ensure a continued stable operation ensuring a weak grid scenario.

According to an embodiment, the wind park comprises a plurality of wind turbines and a wind park controller, wherein the wind park controller comprises an active power controller as described herein.

An advantage of the wind park herein is that some or all of its wind turbines may always be controlled to deliver as much active power as possible, even during weak grid situations, thereby maximizing the annual revenue of the wind park.

Particularly advantageous embodiments and features of the invention are given by the dependent claims, as revealed in the following description. Features of different claim categories may be combined as appropriate to give further embodiments not described herein.

A wind park is in effect a power plant that converts wind power into electricity that is fed into an electrical grid or power network. In the following, therefore, the terms "wind power plant", "wind farm" and "wind park" may be used interchangeably. In this context, a "wind park controller" can be a "park pilot" or other control arrangement that is adapted to regulate the performance of all wind turbines of one or more wind parks. Also, the active power output of a wind turbine can be controlled locally by a wind turbine controller, i.e. a controller arranged to regulate the performance of that wind turbine. In this context, a "wind turbine controller" can be a main computer of a wind turbine. According to an embodiment, a wind turbine controller can assume responsibility for the curtailment of the active power of its wind turbine whenever it is established that the wind turbine does not have enough active current reserve. Otherwise, the active power output of the wind farm can be curtailed by the wind park controller. In the following, the terms "first maximum power value", "wind park maximum power value", and "global maximum power value" may be used interchangeably. The same applies to the terms "second maximum power value", "wind turbine maximum power value", and "local maximum power value".

In the following, it may be assumed that a power network into which a wind park feeds is an electricity grid such as a utility grid. The power generated by a wind park is generally transported by transmission lines such as overhead or underwater transmission lines before being fed into a grid. Transmission lines can be AC or DC lines, and a power network comprises various transformer modules for converting the wind park power into a high voltage level for transport in the transmission line, and further transformer modules for converting the power to a voltage level suitable for transfer through a grid such as a consumer grid or utility grid.

The grid condition indicator is preferably based on a transmission line capacity of a power network to which the wind park is connected. The transmission line capacity can be expressed as a measure of apparent power. As mentioned above, the short circuit ratio (SCR) of a grid is generally a good indicator of the grid strength, and a high value of SCR is generally associated with a "strong grid", while a low value of SCR is generally indicative of a "weak grid". Therefore, in a particularly preferred embodiment, the grid condition indicator is derived from the three-phase short circuit capacity (SCC) of a grid to which the wind park is connected. The three-phase short circuit capacity (in MVA) can be expressed as:

$$SCC = V_{SYS}^2 / Z_{SYS} \quad (1)$$

where $V_{SYS}$ is the transmission system line-line voltage (in kV), and $Z_{SYS}$ is the positive sequence impedance (in Ω). The SCR (a dimensionless number) can then be expressed as $$SCR = SCC/P_{rated} = V_{SYS}^2 / (Z_{SYS} * P_{rated}) \quad (2)$$

where $P_{rated}$ is the rated power of the wind park (in MW). Operation of a wind plant with an SCR less than about 4.0 may result in unstable oscillatory behavior, as explained above.

In one example, for a 50 MW wind park and a line-line voltage $U_{LL}$ of 69 kV, a system impedance of 95Ω would result in an SCC of about 50 MVA, and the SCR in this case would be about 1.0, which is a relatively low value. According to an embodiment, the power output of the wind park would be down-regulated in order to ensure continued stable operation, as will be explained below.

The lower limit of SCR at which stable wind turbine operation is still possible may vary from one manufacturer to another. The SCR is a measure of the grid strength, and is regarded as the parameter of principal interest in assessing stable and sustained operation of converter-based wind plants. Therefore, in a preferred embodiment, the SCR is used as the grid condition indicator. However, the grid condition indicator may also take into account other relevant system characteristics. In a further preferred embodiment, therefore, the grid condition indicator can also be derived from the ratio of apparent reactance to apparent resistance for three-phase short circuit currents. This reactance-to-resistance ratio (also referred to as the "X/R ratio" or "X2R ratio") of a power network to which the wind park is connected is dependent on the system impedance, and can be expressed as:

$$X/R = \frac{X_{SYS}}{R_{SYS}} \qquad (3)$$

where $R_{SYS}$ is the system resistance (in Ω) and $X_{SYS}$ is the system reactance (in Ω).

In the example cited above of a system impedance of 95 n, values of resistance $R_{SYS}$ and reactance $X_{SYS}$ might be 30 and 90 respectively, giving an X2R ratio of 3.0. On the other hand, a resistance $R_{SYS}$ of 14Ω and a reactance $X_{SYS}$ of 94Ω give roughly the same impedance but an X2R ratio of about 6.7, which is significantly higher. The relevance of the X2R ratio depends to some extent on the momentary SCR value. As explained above, a low SCR value indicates a weak grid. However, a low SCR in combination with a low X2R ratio is relatively easy to handle compared to a low SCR in combination with a high X2R ratio, since more power can be transferred to a grid with low SCR and low X2R ratio compared to a grid with low SCR and high X2R ratio. In case of a high grid X2R ratio, more reactive power support is required to transfer the same amount of active power compared to a low X2R, if the value of SCR is the same in both cases.

As indicated above, the maximum amount of active power that can be fed into the grid is mainly determined by the SCR and X2R ratio of the grid. The grid voltage may also be considered. In very weak grids, the active power injection from the wind farm significantly increases the consumption of reactive power in the connected grid which in turn demands more reactive power for voltage support. If the demand cannot be fulfilled, the turbine terminal voltage will be depressed or lowered and cannot return safely to normal operation. As is well known, in weak grids, the active power injection from the wind farm significantly increases the consumption of reactive power in the connected grid, which in turn demands more reactive power for voltage support. If the demand cannot be fulfilled, the turbine terminal voltage will be lowered and the wind turbine will be unable to return safely to normal operation. By deploying additional reactive power compensation equipment such as capacitor banks, a static synchronous compensator or "statcom", static Var compensation, etc., it is possible to bring the voltage back to a safe operating range. Therefore, in a further preferred embodiment, the active/reactive power capability ("PQ capability") of the wind turbines—i.e. a measure of their ability to absorb or inject reactive power or deliver active power—is also taken into account when determining the maximum amount of active power that can be fed into the grid. Any reactive power support equipment deployed by the wind park can change the voltage profile within the wind farm and at the point of common coupling (PCC), and can therefore influence the maximum amount of active power that can be fed into the grid. Therefore, the grid condition indicator and the first maximum power value preferably take into account any reactive power support equipment that is available to the wind park. The effect of reactive power support equipment can be measured as a voltage at the connection point. Therefore, PCC voltage is an effective indicator for maximum active power transfer capability of a certain grid. If the PCC voltage is too low, less active power should be transferred, in order to bring the voltage to a higher level. If the voltage is too high, more active power may be transferred with a voltage profile within a normal operating range.

By compiling a grid condition indicator that takes into account the variables mentioned above, and by regulating or curtailing the active power output of the wind turbines on the basis of this grid condition indicator, the method herein makes it possible to curtail the active power output of a wind power plant to a significantly lesser extent in certain "weak grid" situations, compared to the more radical "worst case" mode of response that is used in prior art solutions.

In a preferred embodiment, the grid condition indicator is dynamically determined in a real-time estimation or measurement procedure. The grid condition indicator can be computed using measurements collected at some suitable point in the power network. For example, measurements of active power, active current, reactive power, reactive current and voltage can be used to compute an SCR value, and these measurements may be taken at a suitable point such as an interconnection point or a point of common connection. Measurements can be recorded and supplied to a processing unit, for example a computer in a wind park controller, which then evaluates the data to determine the grid condition indicator. Alternatively or in addition, in a further preferred embodiment the grid condition indicator can be determined by means of a simulation model.

In a further preferred embodiment, a value of grid condition indicator is provided to a controller of a wind turbine or wind park by an external source. For example, the operator of a grid may also avail of means of determining or computing an SCR value of the grid, and may also be able to determine the X2R ratio of the grid, etc.

The condition of a grid can fluctuate essentially at any time and for various reasons. Therefore, in a further preferred embodiment, the first maximum active power is determined in an online computation or measurement procedure so that a dynamic active power curtailment is made possible. In this context, "online" means that the value of first maximum power is preferably calculated on-the-fly in a wind turbine controller or wind park controller, for example by applying a suitable algorithm that takes into account the variables and factors described above. Alternatively, of course, a value of first maximum active power can be computed "offline" by suitable algorithms on the basis of given operating points or operating conditions in the wind farm.

The second maximum power value changes dynamically with operating conditions and is computed for each wind turbine. The second maximum power value of a wind turbine is determined on the basis of the wind turbine's dynamic PQ capability, and maintains a current reserve as defined by the operating margin. The current reserve or operating margin takes into account that different active and reactive current amounts are required in order to deliver the same amount of active power at different turbine voltages. A higher turbine voltage means less active current is required, leaving more "headroom" for reactive current.

In a preferred embodiment, the operating margin is a current margin that is determined under consideration of the grid condition. In this embodiment, to determine the second maximum power value, the turbine's reactive current component is assigned a higher priority than its active current component, and the active current (and therefore also the active power) is limited with a predefined margin as will be explained below.

The current margin determines the required PQ capability reserve, which may be pre-defined, for a pre-defined voltage profile at the PCC. For example, the current margin can be a function of grid strength, the voltage profile at the PCC), and the X2R ratio:

$$I_{margin} = f(SCR, X/R, VP, X2R) \quad (4)$$

where VP is the voltage profile at the PCC. The current margin $I_{margin}$ can be computed by a controller, or can be determined in an offline calculation using mathematical models for a wind turbine and a wind farm, or by using a known simulation tool in which wind turbines and wind farms have already been modeled. Values of current margin can be provided to a wind turbine controller as a lookup table (LUT). For example, for a specific combination of SCR, X2R, and voltage values, the corresponding value of reactive current margin can easily be identified. The reactive current margin for a wind turbine can then be used to determine a maximum reactive current for that wind turbine as follows:

$$I_{q\_max\_N} = \sqrt{I_{max}^2 - I_{d\_Ref}^2} - I_{Margin} \quad (5)$$

where $I_{max}$ is the current limit of the wind turbine's converter; and $I_{d\_Ref}$ is a reactive current reference for that wind turbine. $I_{q\_max\_N}$ is the maximum active current limit for a turbine.

The power limit for a wind turbine—i.e. the level of active power to which the wind turbine must be curtailed for continued stable operation—can then be expressed as:

$$P_{max\_turb\_N} = I_{q\_max\_N} * U_{turb} \quad (6)$$

where $P_{max}\text{turb}_N$ is the second maximum power value, i.e. the power limit for wind turbine N; $I_{q\_max\_N}$ is the maximum active current limit for that turbine, and $U_{turb}$ is the terminal voltage for that wind turbine. The second maximum active power value will dynamically and automatically change in keeping with the turbine terminal voltage. With the inventive approach described above, the active current is assigned a lower priority than the reactive current, and a wind turbine will supply the required reactive current for voltage or reactive power regulation first.

The "headroom" or operating margin $I_{margin}$ of the remaining current is effectively reserved for active current and/or active power production. Using this strategy, active power curtailment of a wind turbine is performed based on the operating point of the turbine and on the reserved "operating margin". The method herein effectively takes into account the current capability of an individual turbine when deciding by how much to curtail the active power. The first maximum active power value specifies the active power curtailment at the wind farm level. If possible, therefore, a wind park controller would curtail the active power of all wind turbines according to the first maximum power value. However, as indicated above, the method herein allows for a certain operating margin or stability margin, and the second maximum active power value allows the active power curtailment to be performed at the individual turbine level to ensure that this "reserve" is always considered for each individual wind turbine. In order to do so, the active current reference should be always less than the maximum active current limit for a turbine.

$$I_{q\_ref} < I_{q\_max\_N} \quad (7)$$

where $I_{q\_ref}$ is the active current reference determined by a controller such as an active power controller. For example, such a controller can determine the available active power depending on the wind speed. Then, the active current reference can be obtained from $$P_{active} = U_{turb} \cdot I_{q\_ref} \quad (8)$$

where $P_{active}$ is the available active power for that wind speed, and $U_{turb}$ is the turbine voltage, using per unit values.

If equation (7) is satisfied for a wind turbine during a weak grid situation, the required reserve is available, and the wind turbine can be curtailed to the first maximum power value. However, a situation may arise in which a reference active current exceeds the computed stability margin value for a particular wind turbine:

$$I_{q\_ref} > I_{q\_max\_N} \quad (7')$$

In this case, the active power curtailment is performed locally by the wind turbine controller of that wind turbine.

To this end, according to an embodiment, the second maximum power output limit for that wind turbine can be computed separately, using the same approach as described above, but by setting the operating margin, i.e. the current margin, to zero. In effect, during a weak grid situation, the wind turbines of a wind park are curtailed to a lower power value that allows stable operation while at the same time delivering as much active power as possible. The value of power to which a specific wind turbine is curtailed is either the "global" maximum power value or the "local" maximum power value, depending on whether that wind turbine can maintain a stability margin or operating margin as described above. The "local" maximum power value is greater than the "global" maximum power value since it includes the stability margin.

A wind park can feed into more than one grid, and can therefore comprise multiple connection points to these grids. A grid may become weak to such an extent that the active power output of the turbines feeding into that grid would have to be drastically curtailed in order to remain connected. Therefore, in a preferred embodiment, the method comprises the step of moving a feeder line from a first connection point to a second connection point. In this way, if the grid topology permits such a step, the active power of a wind park (or portion of a wind park) can be diverted elsewhere instead of having to be curtailed by an unfavorably large amount. Moving a feeder line from one connection point to another can be done by closing a switch or contactor between those feeder lines.

Other objects and features herein will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the diagrams, like numbers refer to like objects throughout.

DETAILED DESCRIPTION

Figure 1:
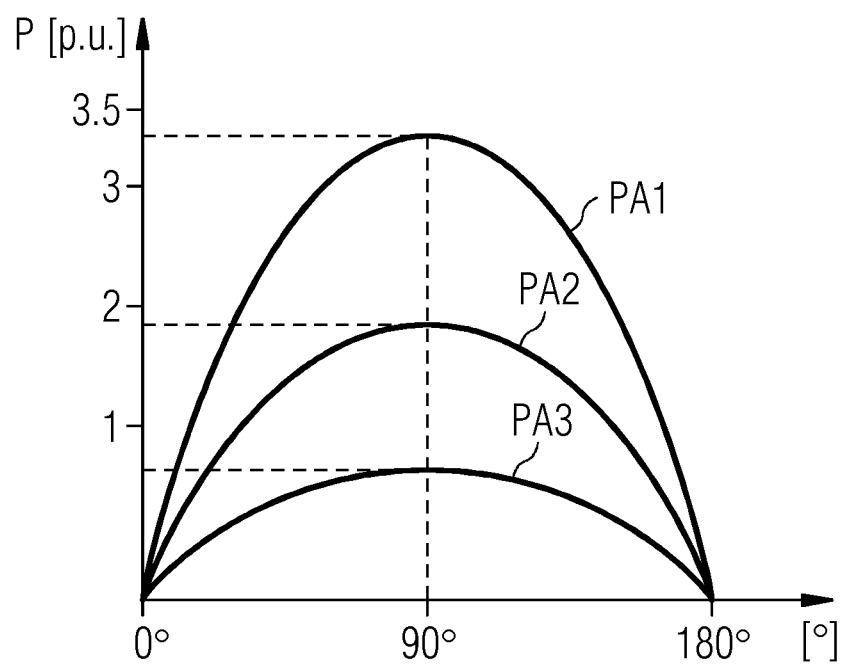
FIG. 1 shows some power-angle curves PA1, PA2, PA3 of a transmission line for different values of line reactance.

FIG. 1 shows some power-angle curves PA1, PA2, PA3 of a transmission line for different values of line reactance. Here, the SCR is expressed as the reciprocal of reactance, assuming nominal voltage (1.0 per unit or pu) and a lossless system ($R_{sys}$=0). The Y-axis shows power P [pu] and the X-axis shows degrees [°]. The power-angle curve PA1 shows the power transfer capacity of the transmission line for a line reactance of 0.3 and an SCR of 3.33, and the maximum power (at 90°) is about 3.4 pu in this case. For a line reactance of 0.6 and an SCR of 1.67, the maximum power is about 1.7 pu as shown by the power-angle curve PA2. The power-angle curve PA3 shows the power transfer capacity of the transmission line for a line reactance of 1.0, for which the SCR is also 1.0, and a corresponding maximum power of only 1.0 pu.

Figure 2:
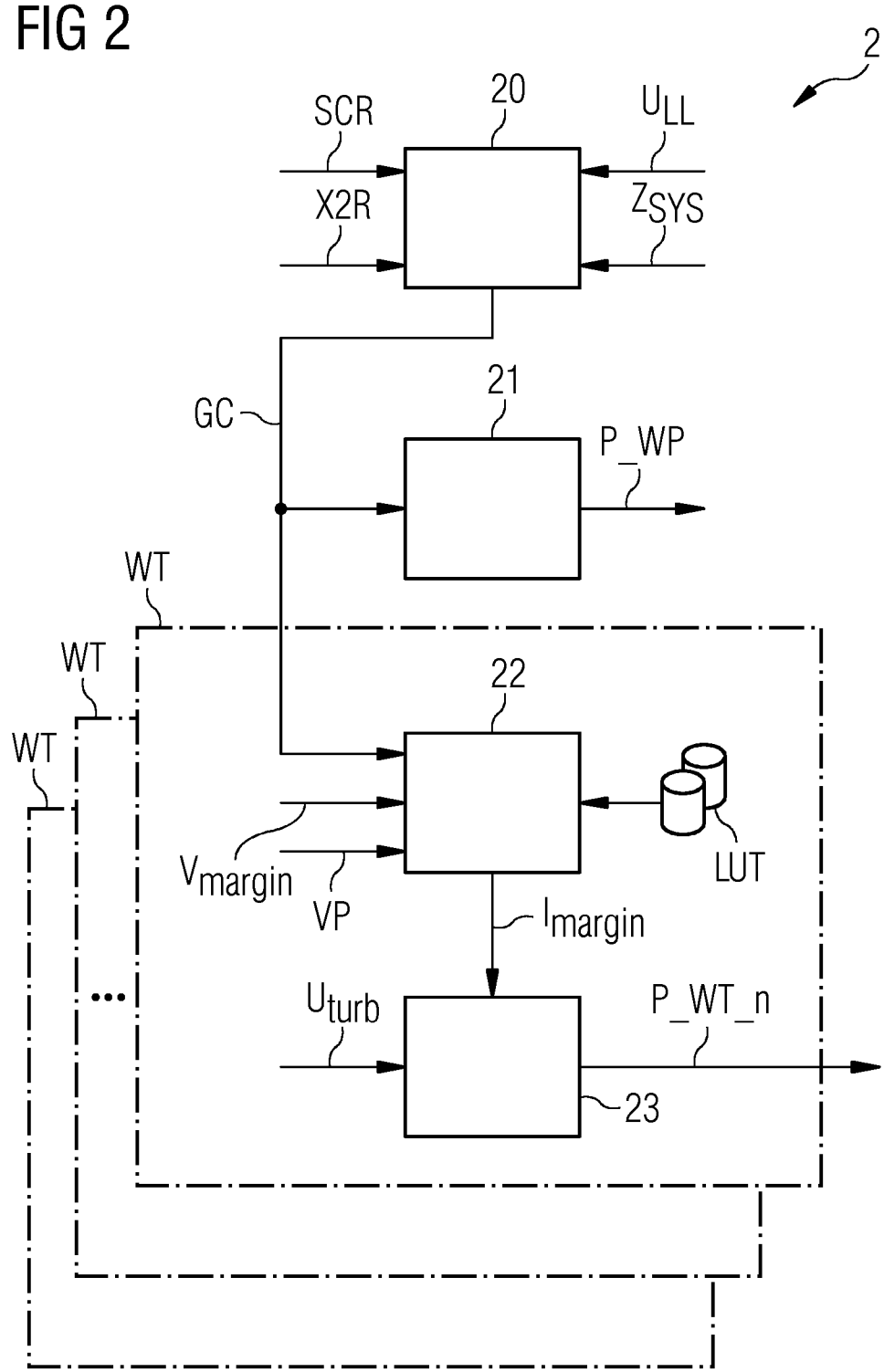
FIG. 2 shows a block diagram of an active power controller 2 according to an embodiment of the invention.

FIG. 2 shows a block diagram of an active power controller 2 according to an embodiment, adapted for use in operating a wind park comprising a plurality of wind turbines. The active power controller 2 comprises a grid condition determination unit 20 for determining a grid condition indicator GCI. Various system variables can be used to compute the grid condition indicator. In this case, values of short-circuit ratio SCR, PCC voltage or line-line voltage $U_{LL}$, system impedance $Z_{SYS}$ and reactance-to-resistance ratio X2R are used as described above. The grid condition indicator GCI is forwarded to a first maximum power computation unit 21 that determines a first maximum power P_WP on the basis of the grid condition indicator GCI. This step is performed in an active power controller of the wind farm.

A high voltage at the PCC can be associated with a higher first maximum active power value P_WP. This value P_WP could be used to curtail the maximum active power produced by all the operating wind turbines of the wind farm. However, curtailing the maximum active power in the wind farm to the first maximum active power value P_WP cannot ensure that an individual wind turbine has a pre-defined current reserve. Therefore, in this embodiment, an operating margin $I_{margin}$ or "current reserve" is determined for individual wind turbines WT, indicated by the plurality of bounding boxes in the diagram. This step is performed locally for each wind turbine, for example in a second maximum power computation unit 23 of a wind turbine. For example, a wind turbine controller 22 can consult a look-up table LUT to deduce the current margin $I_{margin}$ associated with relevant parameters such as the grid condition indicator GCI, a voltage stability margin $V_{margin}$, a voltage profile VP at the point of common coupling, etc. The determined operating margin $I_{margin}$ will determine a second maximum active power value P_WT_n for an individual wind turbine. A second maximum active power P_WT_n (corresponding to the variable "$P_{max\_turb\_N}$" in equation (6)) can dynamically and automatically change in keeping with the terminal voltage $U_{turb}$ of that wind turbine (corresponding to the variable "$U_{turb}$" in equation (6)).

Also, the amount of active power that might need to be curtailed will depend on the operating point of a wind turbine. For example, when operating at a higher voltage, say 1.05 pu (per unit) voltage, the wind turbine needs less active current to produce the same power, and therefore requires less curtailment in the case of a weak grid. If the wind turbine were operating at 1.0 pu voltage, it would need more curtailment in the case of a weak grid.

Effectively, the first maximum active power value P_WP specifies a potential or possible active power curtailment at wind farm level, while the second maximum active power value P_WT_n allows the potential active power curtailment for an individual turbine WT to have a certain reserve. Since the wind turbines WT of a wind park will produce different amounts of active power and may be running at different operating points, different turbines might curtail to different active power levels, depending on an active power distribution strategy used by the wind farm active power controller. In an example scenario, one of the wind turbines might curtail severely, and another turbine might not curtail at all. In order to ensure a pre-defined current reserve for each of the wind turbines, one or more of the wind turbines WT may be curtailed instead to a second maximum active power value P_WT_n as computed by equation (6), taking into account in each case the appropriate stability margin $I_{margin}$. According to an embodiment, a wind turbine WT will be curtailed individually, i.e. by its own controller instead of by the wind park controller, only when it does not have enough reactive current reserve.

In this case, the active power curtailment is effected by issuing updated setpoints to the relevant wind turbines so that their output power is curtailed by an amount large enough to ensure a continued stable operation even though the grid is weak. According to an embodiment, the setpoints are computed so that the active power not curtailed by more than the absolutely necessary amount.

Figure 3:
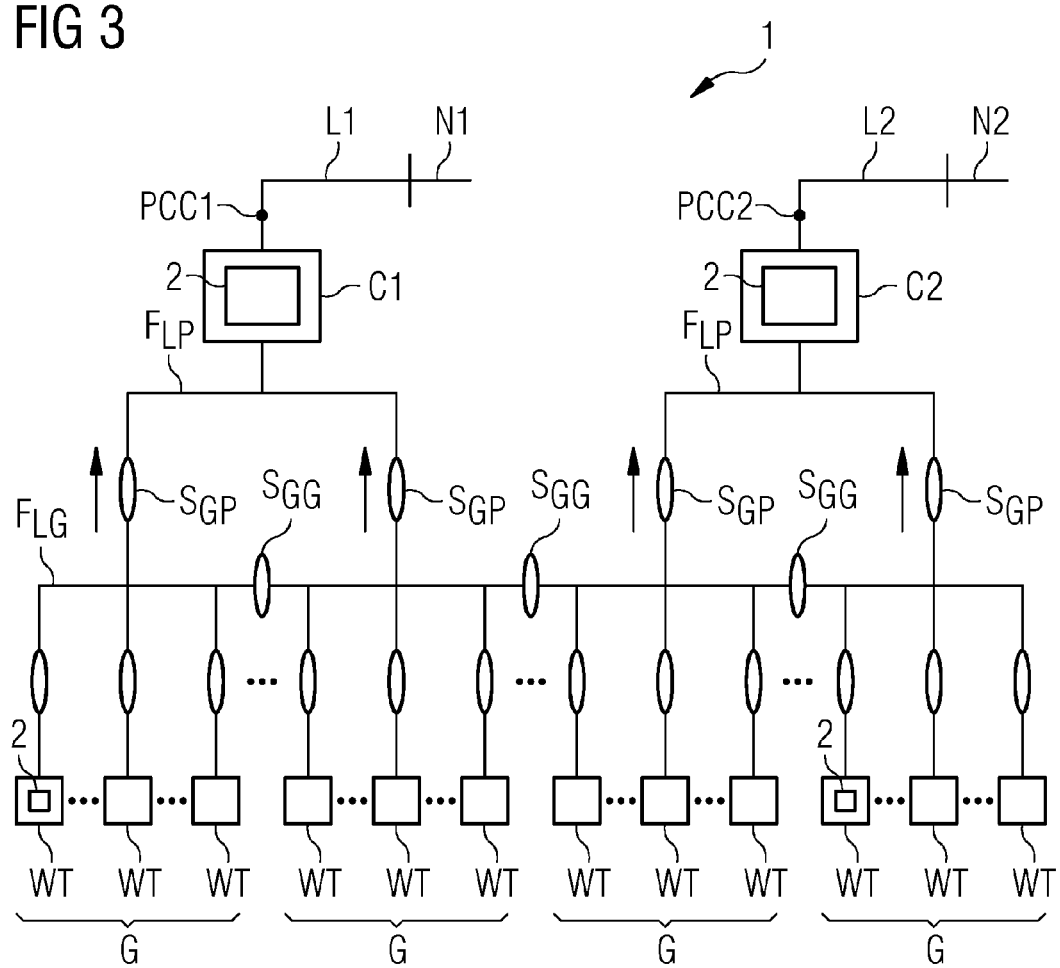
FIG. 3 is a schematic representation of a wind park according to an embodiment of the invention.

FIG. 3 is a schematic representation of a wind park 1 in which wind turbines WT are connected to feeder lines $FL_G$, $FL_P$ that feed into two power networks N1, N2 via park controllers C1, C2 and two transmission lines. An active power controller 2 according to an embodiment can be adapted for one or both park controllers C1, C2 and/or in any controllers ($C_{WT}$) of the wind turbines WT. One transmission line L1, L2 transports power from one connection point PCC1, PCC2 to one power network N1, N2. Here, groups G of wind turbines WT are arranged to feed power into group feeder lines $FL_G$. Local switches $S_G$ control the power input from the wind turbines WT. The group feeder lines $FL_G$ in turn are arranged to feed into park feeder lines $FL_P$. Again, switches $S_{GG}$, $S_{GP}$ are operated to route the power from group feeder lines $FL_G$ to park feeder lines $FL_P$. The direction of active power flow is indicated by the arrows. The switches $S_{GG}$, $S_{GP}$ can be opened or closed as required. In the topology shown here, both grids N1, N2 are "strong", so that the output power from the wind turbines WT is fed into both power networks N1, N2, and the output power of the wind turbines WT does not need to be curtailed.

Figure 4:
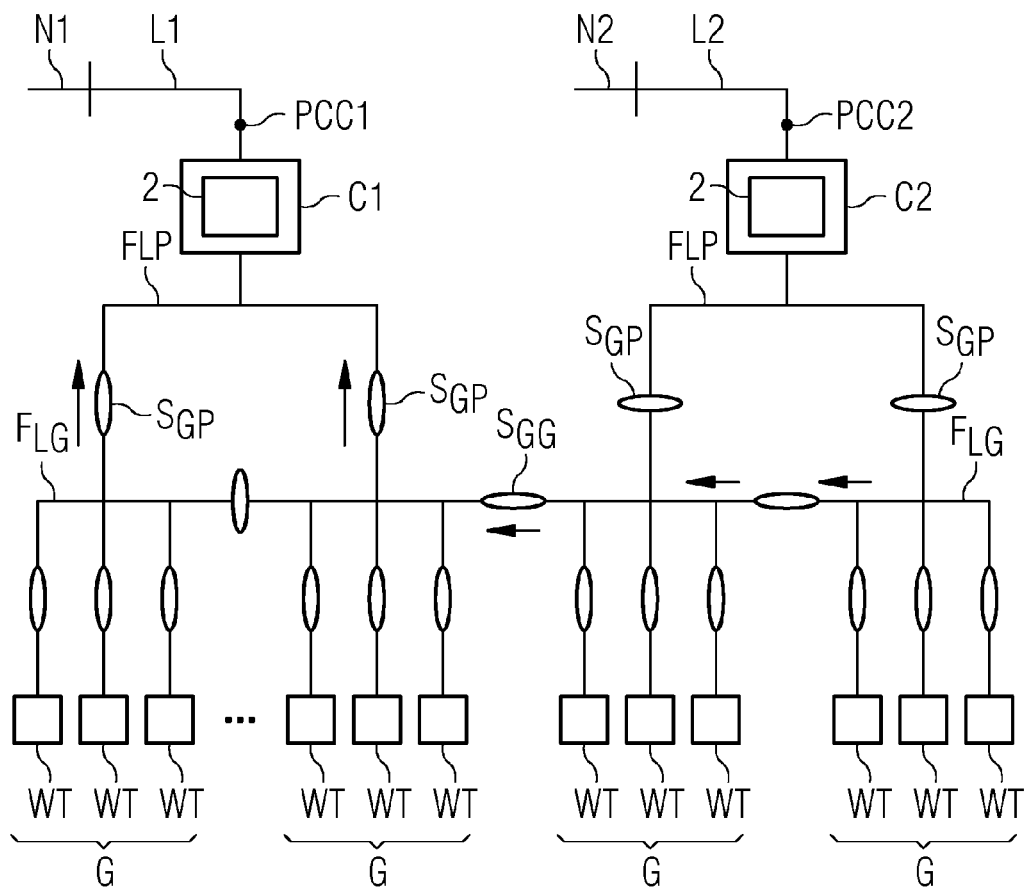
FIG. 4 shows the wind park of FIG. 1 connected to a weak grid.

FIG. 4 shows the wind park 1 of FIG. 1 in a situation in which the second grid N2 is so weak that the active power controller 2 of the park controller C2 has decided to route the power from its wind turbines WT into the first grid N1. To this end, certain switches $S_{GP}$ are closed and other switches $S_{GG}$ opened to route the power from group feeder lines $FL_G$ of the wind turbines WT of the second park controller C2 to the park feeder lines $FL_P$ of the first park controller C1 and into the first power network N1. The new direction of active power flow is indicated by the arrows.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method of operating a wind park comprising a plurality of wind turbines, which method comprises:
   determining by an active power controller:
      a grid condition indicator indicative of a condition of a grid into which the wind park feeds;

a first maximum power value of the wind park based on the grid condition indicator wherein the first maximum power value is the maximum active power that is allowed to be transferred to the grid;
an operating margin based on the grid condition indicator and;
a second maximum power value based on the operating margin wherein the second maximum power value is a power limit for a wind turbine of the plurality of wind turbines; and
curtailing by the active power controller an active power output of the wind park to a lowest maximum power value between the first maximum power value and the second maximum power value that is associated with stable operation of the wind park when the grid condition indicator is indicative of a weak grid.

2. The method according to claim 1, wherein the grid condition indicator is based on a short-circuit-ratio of a power network to which the wind park is connected.

3. The method according to claim 1, wherein the grid condition indicator is based on a reactance-to-resistance ratio of a power network to which the wind park is connected.

4. The method according to claim 1, wherein the grid condition indicator is based on a voltage profile at the connection point of the wind park or a voltage profile within the wind park.

5. The method according to claim 1, wherein the grid condition indicator is based on a voltage-dependent active/reactive power capability of the wind turbines of the wind park.

6. The method according to claim 1, wherein the grid condition indicator is dynamically determined in a real-time manner.

7. The method according to claim 1, wherein an active power output of a wind turbine of the wind park is curtailed to the first maximum power value by a wind park controller.

8. The method according to claim 1, wherein the operating margin comprises a reactive current margin derived from one or more parameters from the set of parameters comprising: short-circuit ratio; ratio of reactance to resistance; voltage stability margin; and voltage profile at a point of common coupling.

9. The method according to claim 8, further comprising providing a look-up-table to a controller, which look-up-table relates operating margin values to one or more parameters from the set of parameters.

10. The method according to claim 1, wherein an active power output of a wind turbine is curtailed to the second maximum power value by a wind turbine controller when the operating margin exceeds a current reserve of that wind turbine.

11. The method according to claim 1 wherein, the wind park comprising multiple connection points to power networks, the method comprises switching a feeder line from a first connection point to a second connection point.

12. A computer program product comprising a non-transitory computer readable medium having instructions thereon for carrying out the method according to claim 1, when the computer program product is loaded into a memory of a programmable device of a wind turbine controller and/or a wind park controller.

13. An active power controller adapted for use in operating a wind turbine of a wind park, which controller programmed to:
determine a grid condition indicator indicative of a condition of a grid into which the wind park feeds;
determine a first maximum power value of the wind park based on the basis of the grid condition indicator wherein the first maximum power value is the maximum active power that is allowed to be transferred to the grid;
determine an operating margin based on the basis of the grid condition indicator;
determine a second maximum power value based on the basis of the operating margin wherein the second maximum power value is the power limit for the wind turbine; and
indicate a curtailment of an active power output of the wind park according to a lowest maximum power value between the first maximum power value and the second maximum power value for a grid condition indicator indicative of a weak grid.

14. A wind turbine arranged in a wind park and comprising a wind turbine controller, which wind turbine controller comprises an active power controller according to claim 13.

15. A wind park comprising a plurality of wind turbines and a wind park controller, wherein the wind park controller comprises an active power controller according to claim 13.

* * * * *